United States Patent
Kylheku et al.

(10) Patent No.: US 12,399,878 B2
(45) Date of Patent: Aug. 26, 2025

(54) SYSTEMS AND METHODS FOR MANAGING FILE TRANSFERS AND UPDATES IN A MULTICELL NETWORK

(71) Applicant: VTech Telecommunications Limited, Hong Kong (CN)

(72) Inventors: Kaz Kylheku, Vancouver (CA); Ralph Tischler, Richmond (CA); Gary Louie, Vancouver (CA)

(73) Assignee: VTECH TELECOMMUNICATIONS LIMITED, Hong Kong (CN)

( * ) Notice: Subject to any disclaimer, the term of this patent is extended or adjusted under 35 U.S.C. 154(b) by 0 days.

(21) Appl. No.: 18/536,103

(22) Filed: Dec. 11, 2023

(65) Prior Publication Data

US 2025/0190411 A1 Jun. 12, 2025

(51) Int. Cl.
*G06F 16/00* (2019.01)
*G06F 16/182* (2019.01)
(Continued)

(52) U.S. Cl.
CPC .......... *G06F 16/219* (2019.01); *G06F 16/182* (2019.01); *H04L 67/06* (2013.01); *H04L 67/1097* (2013.01)

(58) Field of Classification Search
CPC .............................. G06F 16/219; G06F 16/182
(Continued)

(56) References Cited

U.S. PATENT DOCUMENTS

2005/0276237 A1 12/2005 Segal et al.
2006/0007930 A1 1/2006 Dorenbosch
(Continued)

FOREIGN PATENT DOCUMENTS

WO 2005/081499 A1 9/2005
WO 2019/210082 A1 10/2019
WO 2023/105292 A1 6/2023

OTHER PUBLICATIONS

"Digital Enhanced Cordless Telecommunications (DECT); New Generation DECT Phase 1; Part 2: IP Data Service", European H04L Telecommunications Standards Institute (ETSI), Draft ETSI TS 102 527-2 V0.02, Feb. 21, 2007, pp. 1-34.

(Continued)

*Primary Examiner* — Alexandria Y Bromell
(74) *Attorney, Agent, or Firm* — STEPTOE LLP; Carl B. Wischhusen

(57) ABSTRACT

A distributed file management method for a multicell wireless communication network, including: monitoring a shared database to determine, for each wireless terminal of a set of wireless terminals: localization status information, version information of a stored file, and terminal type; updating the localization status information of the set when a new terminal localizes to the base station or a terminal in the set roams away from the base station; comparing, for each terminal of the set, the version information of the stored file and the terminal type to a version identifier and a file type, respectively, of an update file received by the base station to define a set of terminal update candidates; broadcasting the update file to corresponding ones of the set of terminal update candidates, based on a respective file type and a respective terminal type, to initiate an upgrade phase of each of the terminal upgrade candidates.

20 Claims, 8 Drawing Sheets

(51) Int. Cl.
*G06F 16/21* (2019.01)
*H04L 67/06* (2022.01)
*H04L 67/1097* (2022.01)

(58) Field of Classification Search
USPC ........................................................ 707/695
See application file for complete search history.

(56) References Cited

U.S. PATENT DOCUMENTS

| | | |
|---|---|---|
| 2006/0072532 A1 | 4/2006 | Dorenbosch et al. |
| 2006/0154675 A1 | 7/2006 | Chapman et al. |
| 2013/0324112 A1 | 12/2013 | Jechoux et al. |
| 2018/0368082 A1 | 12/2018 | O'Shea et al. |
| 2025/0088315 A1* | 3/2025 | Dimou .................. H04L 1/1822 707/707 |

OTHER PUBLICATIONS

System Multicell: "Gigaset N720 Dect IP Multicell System, Installation, configuration and operation", Jan. 1, 2015, 139 pages, http://gse.gigaset.com/fileadmin/legacy-assets/CustomerCare/Manuals/PRO/N720_PRO/A31008-M2314-L101-5-7619_en_UK_IE.pdf.
Extended European search report from European Patent Application No. 24217155.1, May 7, 2025, 11 pages.
Extended European search report from European Patent Application No. 24217373.0, May 14, 2025, 10 pages.
Extended European search report from European Patent Application No. 24217218.7, May 16, 2025, 7 pages.
Extended European search report from European Patent Application No. 25150321.5, Jun. 12, 2025, 9 pages.

* cited by examiner

| baseId | HandsetVersion | DesksetVersion | CordlessUpgradeStatus |
|---|---|---|---|
| 0 | 1.6.5.146 | 1.6.5.146 | in-progress |
| 1 | 1.6.5.146 | 1.6.5.146 | in-progress |
| 2 | 1.6.5.145 | 1.6.5.145 | idle |
| 3 | 1.6.5.146 | 1.6.5.146 | in-progress |
| 4 | 1.6.5.146 | 1.6.5.146 | Completed |
| 5 | 1.6.5.146 | 1.6.5.146 | Completed |

FIG. 7A

| handsetRef | baseRef | fwVersion | hsState | callRef | Type |
|---|---|---|---|---|---|
| 0 | 1 | 1.6.1.11-0 | 2 | 0 | Handset |
| 1 | 1 | 1.6.1.11-0 | 2 | 0 | Deskset |
| 2 | 1 | 1.6.1.11-0 | 2 | 0 | Deskset |
| 3 | 1 | 1.6.1.11-0 | 2 | 0 | Handset |

FIG. 7B

SYSTEMS AND METHODS FOR MANAGING FILE TRANSFERS AND UPDATES IN A MULTICELL NETWORK

BACKGROUND

Technical Field

The present disclosure generally relates to managing and controlling file transfers and updates in a multicell network that includes a primary base station in communication with one or more secondary base stations providing communication among wireless terminals.

Description of the Related Art

A wireless network may include one or more base stations ("bases") in communication with one or more wireless terminals. The wireless base stations are interconnected. In one particular example, a network comprises a primary base station and may include one or more secondary base stations (although a secondary base station is not necessarily required). A number of terminals connect wirelessly to these base stations, with the terminals roaming freely from one base station to another.

Terminals often require file updates or upgrades to various files. Update files may include firmware image files or other types of files. New firmware files, shared directory files, or other types of files are propagated or broadcast from the primary base station to any secondary base stations and to the terminals.

However, there are various drawbacks associated with existing methods of managing and broadcasting update files to terminals that roam among bases. For example, conventional approaches do not efficiently and effectively determine which files stored on terminals require updates, and do not optimally manage and control file transfers and updates to terminals. Existing methods also do not adequately account for terminals roaming away from bases.

SUMMARY

Disclosed embodiments are directed to improving the management and control of file transfers to wireless terminals. Such file transfers may include the transfer of update files. Update files (or upgrade files) are software files or data files that provide improvements, updates, or upgrades to terminals. Update files may include firmware image files for firmware upgrades, as well as application files, directory files, configuration files, wallpaper files, background files, or other files that provide updates to files stored on terminals. The update files may, for example, be of a different, more recent, or more current version than the files stored on terminals.

As noted above, in a typical network there are various different types of wireless terminals that roam among the bases. The terminals have various files stored thereon. In some approaches, update files are sent from bases to terminals via a broadcast mechanism in which update files downloaded to a base are broadcast immediately. As one non-limiting example, the terminals can run different firmware images. Firmware images are sent from bases to terminals via a broadcast mechanism. In some approaches, firmware images downloaded to a base are broadcast immediately, and several kinds of firmware images are broadcast at the same time.

Conventional approaches do not efficiently and effectively determine which files stored on terminals require updates, and do not optimally manage and control file transfers and updates to terminals. As one example, conventional approaches do not efficiently and effectively determine which terminals require upgrades and which terminals have already received, or have not yet received, upgrades. This is one reason why broadcasting from base stations several kinds of firmware images at the same time is not optimal and indeed is often inadvisable. Furthermore, conventional approaches do not re-try upload cycles of files from bases to terminals and therefore if an upload cycle was not successful and the terminal did not receive the files the base may not be aware of that fact. Conventional approaches also do not monitor roaming globally among the bases in the context of uploads; an upload broadcast emanating from a given base is only visible to the terminals localized to that base. Such conventional coordination of file uploads is not sensitive to terminals localizing to a base and roaming away and the effect such roaming has on the success of the upload broadcast. Conventional approaches also do not have a comprehensive user interface that enables the status and progress of uploads plainly visible.

Disclosed embodiments are directed to improving the management and control of file transfers to wireless terminals including update files. Such management and control can be made more efficient and effective as described further herein.

Technical solutions and advantages are realized throughout the application.

The present disclosure provides a distributed dynamic mechanism or system in a multicell communication network to manage file transfers to attached or localized wireless terminals. The system arranges transfer of files to attached/localized terminals according not only to the attached terminal type, but also according to the file version installed on the attached/localized terminal. The system is adaptive to when a terminal moves from one base to another, possibly in the middle of a transfer. The system is adaptive to when a new terminal joins the network or when a terminal leaves the network. In the present disclosure a terminal being "attached" or "localized" to a base means that the terminal is in communication with the base during operation.

The system, in embodiments, uses distributed logic which can ensure that all terminals in the network are updated with the correct or most recent version of a software or data file, irrespective of which base a terminal is on, what software file is installed on the terminal, and whether a terminal joins or leaves the network. By virtue of the features of the present disclosure, file continuity across the network can be assured regardless of the above circumstances.

In embodiments, there is a file manager in each base, and all primary or secondary base stations access a shared system status database that provides all of the information about all of the terminals attached to each base. The bases then are enabled to make decisions about what files to upload to an attached terminal, and in what priority at any given time according to the dynamic needs of terminals currently attached to a particular base. One advantage is that broadcast or communication channel usage can be minimized by tailoring the broadcast files to only those files needed by the terminals currently attached or localized to the base.

Accordingly, in example embodiments the present disclosure is directed to systems and methods for managing and coordinating over-the-air firmware upgrades of terminal devices that are wirelessly connected to a network of base devices. These systems and methods may coordinate upgrades of firmware files as well as configuration files, shared directory files, and other types of files. In example embodiments the methods may be performed by a file upload manager or file update manager that is extensible to new kinds of files with different upgrade disciplines. The methods may prioritize among the file types and can ensure that only one file type is broadcast at a time.

In one example embodiment the present disclosure is directed to a distributed file management system in a multicell wireless communication network. The network comprises one or more base stations which communicate with wireless terminals, each base station comprising a file manager of the file management system to control file transfers to the wireless terminals. The file manager comprises at least one processor in a base station, and memory operatively coupled to the at least one processor. The memory includes instructions that, when executed, cause the at least one processor to monitor a shared database to determine, for each wireless terminal of a set of wireless terminals, localization status information, version information of one or more stored files, and terminal type. The instructions also cause the at least one processor to update the localization status information of the set of wireless terminals when a new wireless terminal localizes to the base station or a wireless terminal in the set of wireless terminals roams away from the base station. The instructions also cause the at least one processor to compare, for each wireless terminal of the set of wireless terminals, the version information of the one or more stored files and the terminal type to a version identifier and a file type, respectively, of one or more update files received by the base station to define a set of wireless terminal update candidates. The instructions also cause the at least one processor to broadcast the one or more update files to corresponding ones of the set of wireless terminal update candidates, based on a respective file type and a respective terminal type, to initiate an upgrade phase of each of the wireless terminal upgrade candidates.

BRIEF DESCRIPTION OF THE DRAWINGS

FIGS. 7A and 7B are example terminal status tables including status records of terminals.

Figure 1:
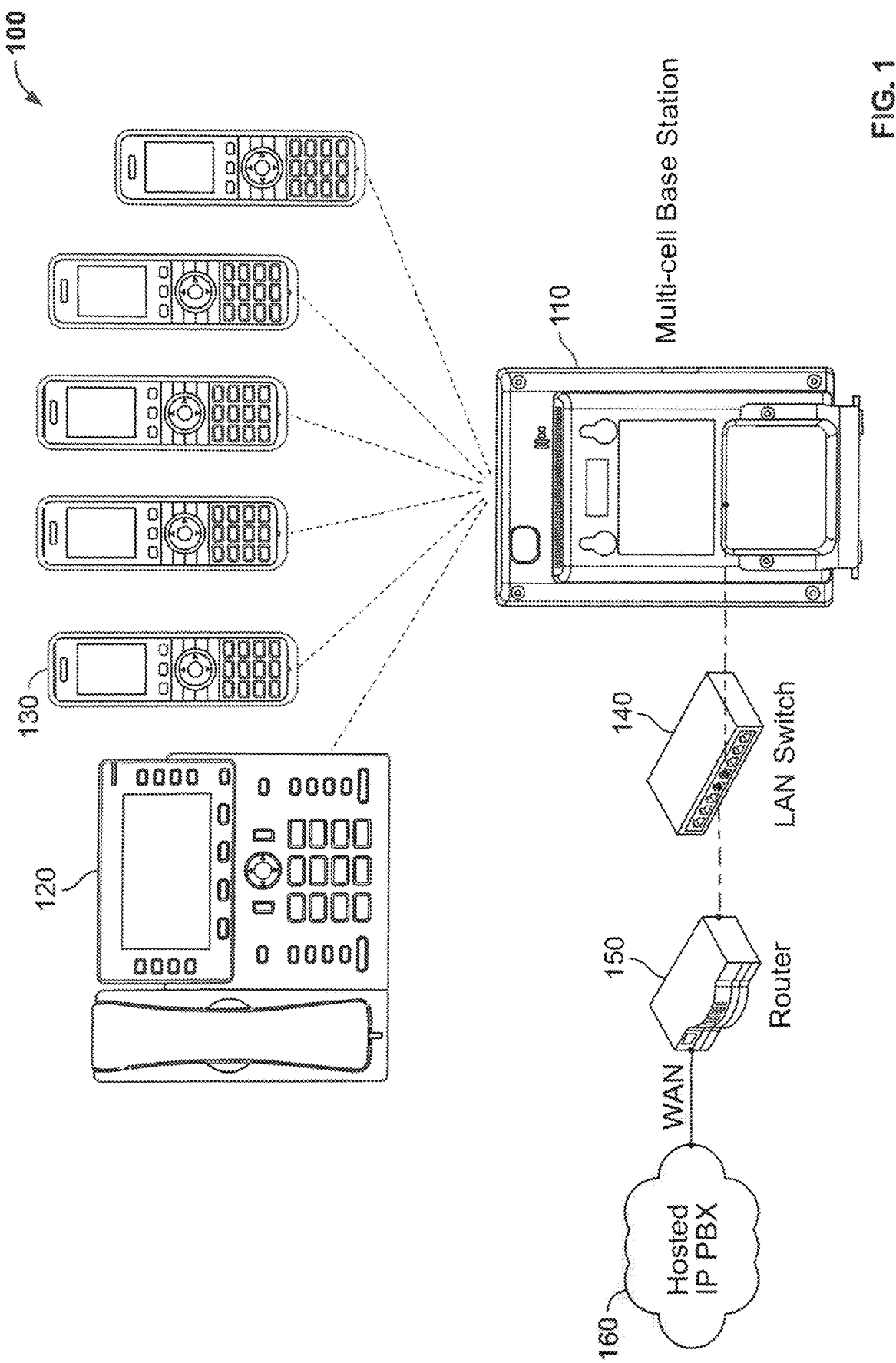
FIG. 1 depicts a set of equipment for a Digital Enhanced Cordless Telecommunications (DECT) system including a multicell base station and a number of wireless terminals, the system adapted for managing and controlling file transfers and updates to wireless terminals.

Where considered appropriate, reference numerals may be repeated among the drawings to indicate corresponding or analogous elements. Moreover, some of the blocks depicted in the drawings may be combined into a single function.

DETAILED DESCRIPTION

In the following detailed description, numerous specific details are set forth in order to provide a thorough understanding of the present teachings. However, it will be understood by those of ordinary skill in the art that the presently taught approaches and the example embodiments provided herein may be practiced without these specific details. In other instances, well-known methods, procedures, components, and circuits have not been described in detail so as not to obscure the presently taught approaches and techniques.

FIG. 1 depicts a set of equipment 100 for a Digital Enhanced Cordless Telecommunications (DECT) system including a multicell base station 110 and a number of wireless terminals (120, 130), the system adapted for efficiently and effectively managing and controlling transfer of update files to wireless terminals. As noted above, update files may include software files or data files that provide improvements, updates, or upgrades to terminals, including firmware image files for firmware upgrades, or other types of files such as application files, directory files, configuration files, wallpaper files, background files, or others that provide updates to files stored on terminals. The update files may, for example, be of a different or more recent or more current version than the stored files.

In the example depicted in FIG. 1, the base station 110 is set up to communicate with a cordless deskset 120 and a number of cordless handsets 130. In some cases, the base station 110 may be connected to a local area network (LAN) switch 140, which is in communication with a router 150. The router 150, in turn, is connected to an end or external server, such as a hosted Internet Protocol (IP) private branch exchange (PBX) 160 which provides access to the public switched telephone network. In embodiments, there are multiple base stations 110 and wireless communication terminals (120, 130). The wireless terminals (120, 130) may roam among base stations 110 during operation.

Terminals execute firmware, each firmware being of a particular version. There are various types of terminals with dedicated, different firmware. Terminals use firmware files that are specific to a terminal type, and may also need additional files, such as "shared directory" files or others. Unlike firmware files, shared directory files and other types of files may not be specific to a terminal type.

In embodiments, one base station is set up as a primary base station and all other base stations are set up as secondary base stations. In some cases, firmware files are uploaded to the primary base station by a provisioning process. Similarly, shared directory files or other types of files are also uploaded to the primary base station. In particular, the primary base station receives update files representing changes or upgrades to wireless terminals, such as configuration changes, firmware upgrades, and others, as described further herein. The primary base station then propagates, i.e., transmits, such update files to the secondary base stations via a distributed file management system. Firmware upgrades and other types of files which are relevant to wireless terminals, as opposed to the base stations, are communicated to each wireless terminal by the base station to which the wireless terminal is attached or localized, i.e., the base station with which the wireless terminal is in communication during operation.

Figure 2:
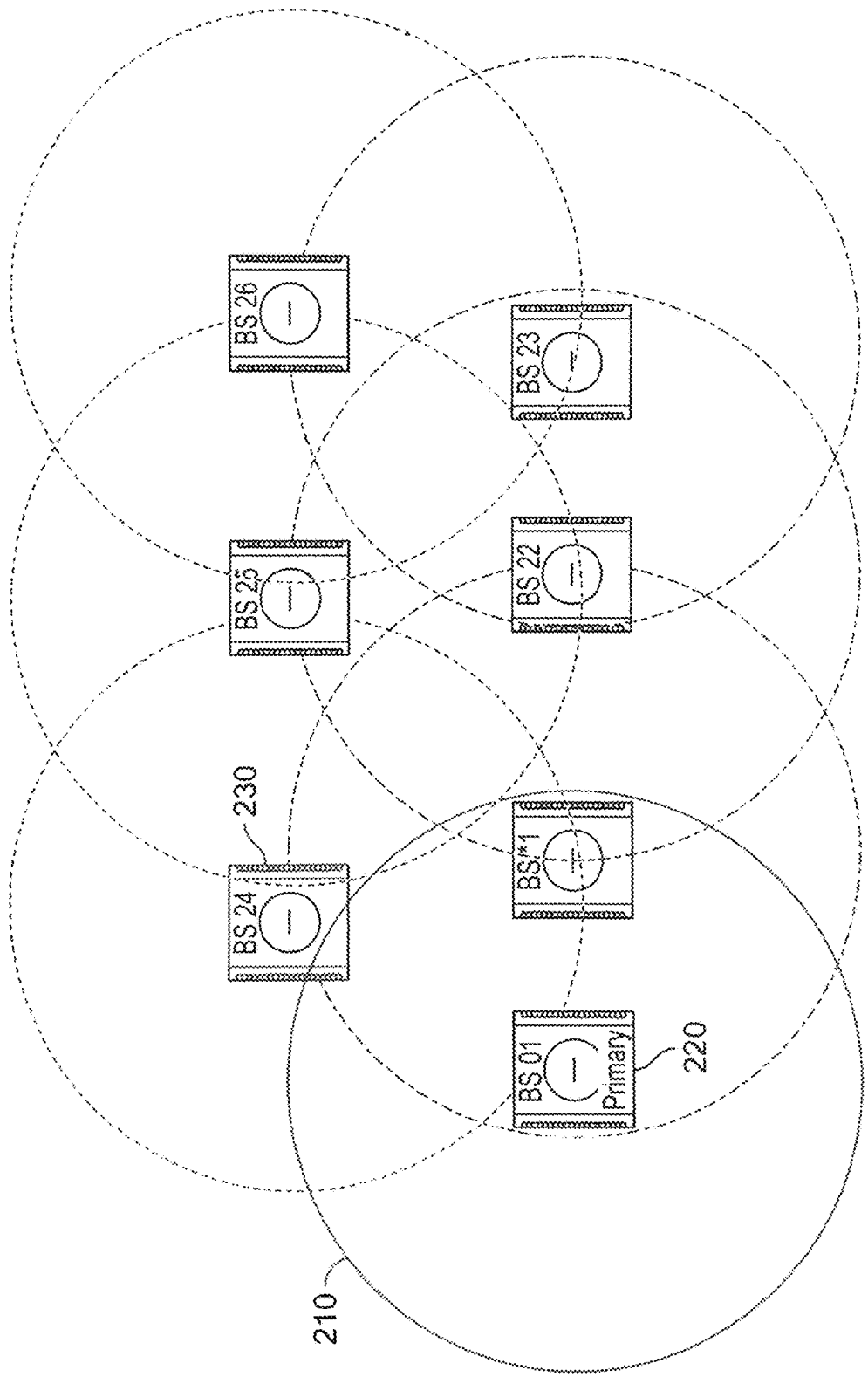
FIG. 2 depicts a primary base station and a number of secondary base stations of a DECT multicell system, each of which is responsible for communicating with wireless terminals.

FIG. 2 depicts a primary base station 220 and a number of secondary base stations 230 of a DECT multicell system 200, each of which is responsible for communicating with wireless terminals, e.g., cordless handsets 130 (see FIG. 1), within a specific area or "cell" 210. Each cell 210 overlaps with the neighboring cells to ensure there are no gaps in coverage. When a handset 130 is first used in the system 200, it is registered with the base stations (220, 230), which record its unique ID. Generally, when the handset 130 makes a call, the closest base station (220, 230) sets up the call, i.e., the base station (220, 230) to which the handset 130 is "localized." This process is facilitated through a frequency/time slot pattern, with each base station (220, 230) and handset pairing given a unique pattern to avoid interference. As a handset 130 moves from the coverage area, i.e., cell 210, of one base station (220, 230) to another, the system performs a handover. This involves the base station with a weakening signal handing over the connection to the base station where the signal is getting stronger. This process is seamless to the user, who does not experience any interruption in their call.

DECT uses Time Division Multiple Access (TDMA) to allow multiple handsets to communicate with the base station simultaneously. It divides the communication channel into multiple time slots, and each handset is assigned a specific time slot in which to transmit and receive information. DECT systems use encryption to secure the communications between the handsets and base stations. The DECT standard specifies the use of the DECT Standard Authentication Algorithm (DSAA) for authentication and the DECT Standard Cipher (DSC) for encryption.

Figure 3:
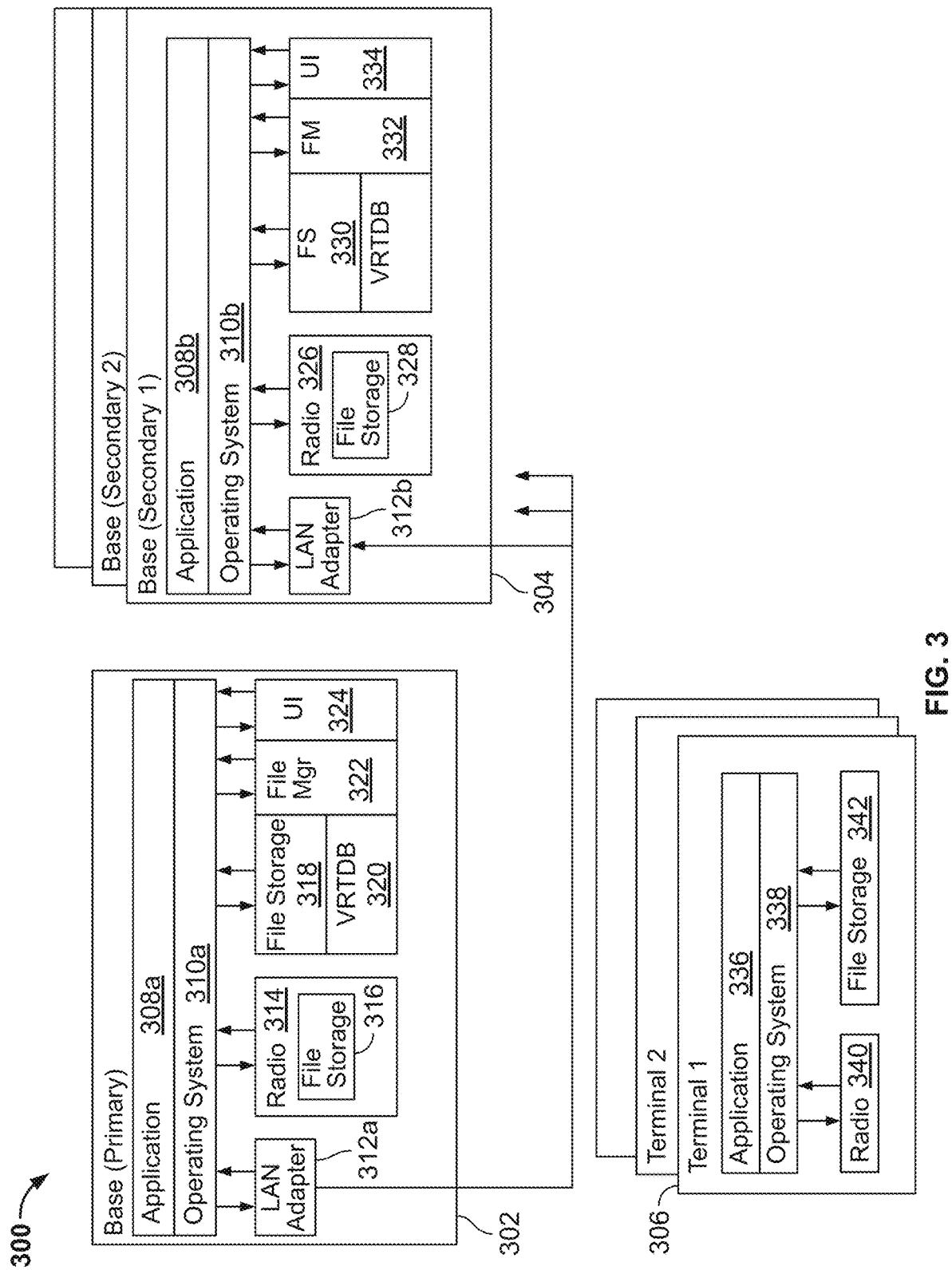
FIG. 3 depicts a system including a primary base station and one or more secondary base stations for managing and controlling file transfers and updates to wireless terminals according to an example embodiment.

FIG. 3 depicts a system 300 including a primary base station 302 and one or more secondary base stations 304 for efficiently and effectively managing and controlling file transfers and updates to wireless terminals, according to an example embodiment. Each primary base station 302 or secondary base station 304 has a file manager executing thereon.

In more detail, the primary base station 302 comprises an application 308a for carrying out various functions of the base station, e.g., call control, an operating system 310a, and a LAN adapter 312a. A radio 314 receives files including update files and stores the received files in file storage 316. The files may be received during operation from, e.g., a remote source via a network and/or via a user interface allowing access to the update files. In some cases, the primary base station may be programmed to periodically check for and download file updates from a server of a manufacturer or network administrator.

The received files may include update files for providing improvements, updates, or upgrades to wireless terminals 306, as described herein. Another file storage 318 is available for further or more permanent storage of received files. The primary base station 302 further comprises a Volatile Run-Time Database 320, a file update manager 322, and a user interface 324, each of which will be described in detail herein.

Each secondary base station 304 comprises an application 308b for carrying out various functions, an operating system 310b, and a LAN adaptor 312b. A radio 326 receives files, e.g., from the primary base station 302, and stores the received files in file storage 328. The received files may include update files for providing improvements, updates, or upgrades to wireless terminals 306, as described herein. Another file storage 330 is available for further or more permanent storage of received files. As described further herein, each secondary base station 304 is enabled to update the site-wide VRTDB 320 with information received from terminals 306. Each secondary base station 304 further comprises a file update manager 332 and a user interface 334, each of which will be described in detail herein.

Each wireless terminal 306 has an application 336 for performing the various functions of the wireless terminal in accordance with DECT protocol, an operating system 338, a radio 340, and file storage 342. The radio 340 receives files from attached bases and stores the received files in the file storage 342. The received files may include update files for providing improvements, updates, or upgrades to the wireless terminals 306, as described herein. Upon localizing to a base, e.g., a secondary base station 304 (if any), a wireless terminal 306 informs the base station to which it is localizing of various status information as described below. The system 300 maintains and manages the status information for each wireless terminal 306.

In more detail, in the system 300, the primary base station 302 communicates with the secondary base stations 304 via a local area network (LAN) using LAN adapters 312a, 312b. The primary base station 302 and the secondary base stations 304 communicate with the terminals 306. Files including update files are transmitted over the wireless network from bases to terminals. As noted above, update files may include software files or data files that provide improvements, updates, or upgrades to terminals, including firmware image files for firmware upgrades, or other types of files such as application files, directory files, configuration files, wallpaper files, background files, or others that provide updates to files stored on terminals. As one non-limiting example, a terminal 306 can accept a new firmware image (e.g., a replacement Application 336 and Operating System 338) in its file storage 342. Firmware files may be distributed from the primary base station 302 to secondary base stations 304 over a wired network, for example.

Referring again to FIG. 3, in disclosed embodiments the system 300 may maintain status information related to the status of terminals 306 in the site-wide Volatile Real-Time Database (VRTDB) 320. The VRTDB 320 includes a terminal status table which contains a status record for each wireless terminal 306 with various types of terminal-specific or status information. Status information may include, for example, localization status information of each terminal 306, i.e., which base each terminal 306 in the network is currently localized to. Status information may also include terminal type of each terminal 306. Status information may also include file type information (e.g., firmware files, application files, directory files, configuration files, wallpaper files, background files, etc.) of files stored on each terminal 306. Status information may also include file version information (e.g., a version number, variable, or other value/identifier) of files or firmware stored on each terminal 306. All of this information (e.g., the state of all uploadable files on the terminal 306, including current installed file version information) can be reported to an attached base from the terminal 306 as the terminal 306 localizes to the base, at which point the base can update the site-wide VRTDB 320. The information can be recorded in the VRTDB 320 as fields in each status record. A status record may correspond to a file or files stored in the file storage 342 of a respective wireless terminal 306.

Other information can be recorded into the VRTDB 320 as well, including information related to bases. For example, the system 300 may also maintain, in the VRTDB 320, the progress of file upload flows in both directions relative to the primary and secondary base stations, i.e., secondary to primary and primary to secondary. Files are transmitted over the wireless network from bases to terminals. By virtue of the VRTDB 320, each file manager 322, 332 can monitor several kinds of events. Each file manager 322, 332 examines and can update various records in the VRTDB 320.

FIGS. 7A and 7B are example terminal status tables including status records such as localization status information of terminals, i.e., which base (baseidor baseRef) each terminal (handsetRef) in the network is currently localized to; terminal type of each terminal (e.g., type such as handset or deskset); file version information (e.g., HandsetVersion, DesksetVersion, fwVersion); progress status information (CordlessUpgradeStatus such as In-progress, Idle, or Completed). It is of course to be understood that the status tables shown in FIGS. 7A and 7B are just examples and that the disclosed embodiments are not limited thereto.

In implementations, the VRTDB 320 may be part of a distributed configuration subsystem which is responsible for managing and controlling transfers of update files, e.g., propagating firmware, configuration, or other changes, throughout the system. In embodiments, the distributed configuration effects a flow of such changes from the primary base station 302 to the secondary base stations 304, whereas the VRTDB records flow in both directions. For example, a Terminal 1, upon localizing to Secondary Base 1, sends its status information to Secondary Base 1. Secondary Base 1 enters the status information into the VRTDB record for Terminal 1, which then flows toward the Primary Base. The Primary Base then sends the record to Secondary Base 2 as part of the routine transmission of VRTDB data. Thus, eventually the entire system is informed of the status information of Terminal 1.

It is noted that the VRTDB 320 is shown in FIG. 3 as being located in the primary base station 302 but this is just an example and the VRTDB 320 may be located in any suitable location even if not formally a part of the primary base station 302. In any event the VRTDB 320 can be accessible to all primary or secondary base stations as described herein.

In implementations, each file manager 322, 332 can react to dynamically changing situations. For example, each file manager 322, 332 can react to the changing status of the terminals 306 in the terminals 306 localizing to the current base, roaming away, and reporting successful file updates to a new or more recent/current file version. A file manager 322, 332 can determine whether terminals 306 are present that require some kind of upgrade, i.e., have files that should be or need to be updated, e.g., because the base has received a newer version of a particular file. When terminals 306 are present having files that are out of date with regard to current files received by the base the file manager drives upload activity as described herein.

The file manager 322, 332 can also ensure/confirm that files are uploaded to the radio module 340 of a terminal 306. The file manager 322, 332 can implement provisions for handling failed uploads. For example, when terminals 306 have not received files within a specific window of time, which may be predetermined, the file manager 322, 332 deems the upload cycle to have failed. Failed cycles are re-tried one or more times, after which a manual re-start request may be required.

When terminals 306 report having received an update of a particular file, or when terminals 306 roam away, such terminals 306 can be removed from the set requiring an upgrade of that particular file, given that the particular file now matches with (e.g., has the same version as) the currently broadcast file. When a new update is available at a base of a file that is currently being broadcast to a terminal 306, the upgrade of the terminal 306 can be canceled. If a terminal 306 being upgraded roams away from a base or otherwise disappears, the file update of the terminal 306 can promptly be stopped. Then if other terminals 306 are still present which require some other kind of file update, that other file update can proceed.

In implementations, each file manager 322, 332 is also monitoring the state of the radio on its respective base, and does not initiate any broadcasts before the radio is ready. Such scenarios can include, but are not limited to, when the radio's firmware is being upgraded.

As described herein, a file manager 322, 332 is responsive to the event that a new file has been made available. A new file is first uploaded to the base's radio module 314, 326 for broadcast. As one non-limiting example, this can take several minutes for a firmware file. A failed upload to the radio module 314, 326 (e.g., bad checksum) can be re-tried. A broadcast of a file to the terminals 306 can only proceed when the radio module 314, 326 has a good copy of that file with a valid checksum.

Each base station 302, 304 has a user interface 324, 334 accessible thereon for users to interact with. The user interface 324, 334 can have multiple views. The VRTDB 320 has a list of all bases indicating which terminals are localized to which base. The VRTDB 320 also has a list of which files are available on which base. The user interface of a particular base can display this list. If files are in the progress of being uploaded to a radio module of a particular base, that progress can also be displayed on the user interface 324, 334. The user interface 324, 334 can also display (1) a view of all terminals 306, (2) to which base each terminal 306 is localized, (3) the versions of the respective file types that each terminal 306 currently has, (4) whether respective terminals are currently being updated and with which file type(s), etc.

Accordingly, each base station 302, 304 comprises a user interface 324, 334 that can display all terminals all bases. The user interface 324, 334 can display a view of the state of the file upload managers. For example, the user interface 324, 334 can display whether a base is idle or upgrading a terminal 306 with a file type, and the particular file type(s) being upgraded. The user interface 324, 334 can also indicate for each base whether its radio is ready. When a base is rebooted, the radio is not ready for some time (possibly a lengthy time if the radio is undergoing a firmware upgrade), during which time terminal upgrades are not possible. The user interface 324, 334 can be provided with and display the status reported by the file managers across the site, due to a software upgrade over-the-air (SUOTA) table that is located in the VRTDB 320. The user interface 324, 334 can be provided with and display the status of terminals 306 attached to other bases, due to the terminal status table in the VRTDB 320.

Figure 4:
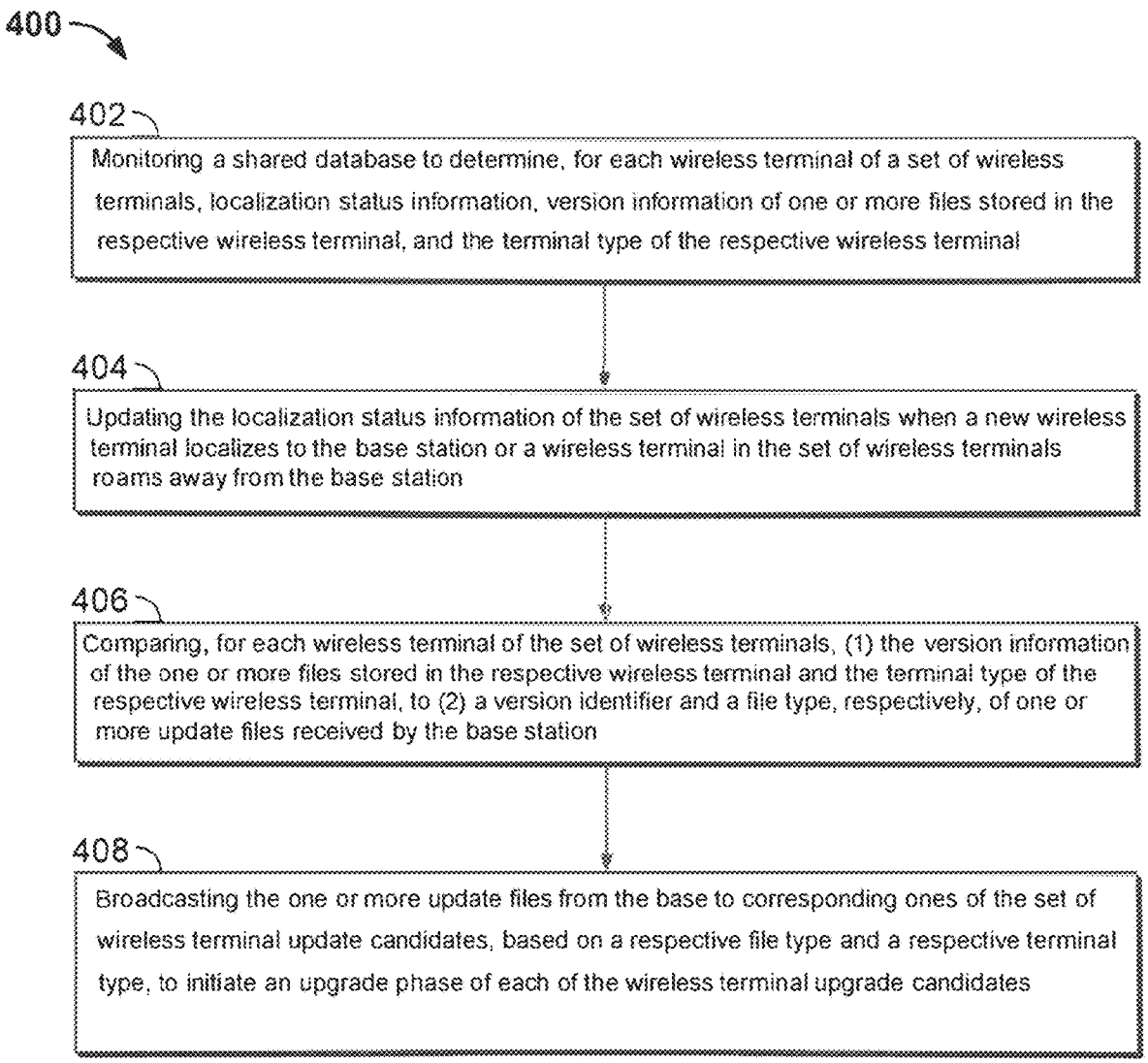
FIG. 4 is a flowchart of a method for managing and controlling file transfers and updates to wireless terminals in a multicell network, according to an example embodiment.

FIG. 4 is a flowchart of a method 400 performed by a distributed file management system in a multicell wireless communication network, such as the system 300 of FIG. 3, for optimally managing and controlling file transfers and updates to wireless terminals according to an example embodiment. As shown in the example embodiment of FIG. 3, the network comprises one or more base stations 302, 304 which communicate with wireless terminals 306, each base station 302, 304 comprising a file manager 322, 332 of the file management system 300 to control file transfers to the wireless terminals 306. The file manager comprises at least one processor (not shown in FIG. 3) in the base station and a memory (also not shown in FIG. 3) operatively coupled to the at least one processor. The memory includes instructions that, when executed, cause the at least one processor to perform the method 400.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Returning to FIG. 4, the method includes monitoring (402) a shared database such as VRTDB 320 to determine, for each wireless terminal 306 of a set of wireless terminals, localization status information, version information of one or more files stored in the respective wireless terminal 306, and the terminal type of the respective wireless terminal 306.

Status information in the VRTDB 320 may be received from the bases. The status information may be reported to the bases by the respective wireless terminals 306 localized to the respective bases. For example, localization status information for a wireless terminal 306 localized to a respective base is known by the respective base. A wireless terminal 306 reports to the localized base current version information of files stored on the terminal 306 such as firmware files, configuration files, and others; upon localizing to a base, e.g., a secondary base station 304 (if any), the wireless terminal 306 informs the base station to which it is localizing of its status information. The system 300 maintains and manages the status information for each wireless terminal 306, for example in the VRTDB 320.

The method 400 further includes updating (404) the localization status information of the set of wireless terminals when a new wireless terminal 306 localizes to the base station or a wireless terminal 306 in the set of wireless terminals roams away from the base station. The system is adapted to handle situations in which a wireless terminal roams, i.e., dissociates from a base and localizes to a different base. The system is also adapted to handle situations in which a new wireless terminal is introduced into the site.

The method 400 further includes comparing (406), for each wireless terminal 306 of the set of wireless terminals, (1) the version information of the one or more files stored in the respective wireless terminal 306 and the terminal type of the respective wireless terminal 306, to (2) a version identifier and a file type, respectively, of one or more update files received by the base station. One purpose of the comparison is to define a set of wireless terminal update candidates.

As discussed previously the update files may include one or more of firmware image files, application files, directory files, configuration files, wallpaper files, background files, or others. Firmware image files are specific to terminal type, while other files, such as shared directory files, are not specific to terminal type. In an example embodiment with regard to the comparing of the version information, a wireless terminal 306 is included in the set of wireless terminal update candidates if a file of the one or more update files received by the base station is more recent or more current than a corresponding file of the one or more stored files.

The method 400 further includes broadcasting (408) the one or more update files from the base to corresponding ones of the set of wireless terminal update candidates, based on a respective file type and a respective terminal type, to initiate an upgrade phase of each of the wireless terminal upgrade candidates.

File types may be arranged according to priority and are preferably broadcast from highest to lowest priority. For example, the one or more update files may be prioritized according to the respective file type thereof so that higher priority update files are broadcast before lower priority update files. Along these lines, a higher priority can be assigned to any of the one or more update files that are firmware files, relative to any of the one or more update files that are not firmware files.

In an example embodiment the upgrade phase is stopped for any wireless terminal update candidate that roams away from the base station, as determined based on the location status information of the set of wireless terminals. The upgrade phase of any wireless terminal update candidate that had roamed away from the base station can be resumed or restarted upon the wireless terminal update candidate localizing again to the base station.

In an example embodiment a currently broadcasting update file of the one or more update files is stopped if there are no remaining wireless terminal upgrade candidates having a terminal type that corresponds to a file type of the currently broadcasting update file.

In an example embodiment when a version of a file stored on a terminal 306 differs from (e.g., is not as current or recent as) the version of the file maintained by the system, that terminal 306 is identified as needing an update of that file or file type. The system may determine when it is a good time, from an operational standpoint, to communicate with wireless terminals 306 which requires file updates to initiate the update process. The update process is initiated by informing the to-be-updated terminal of a new file version. The base to which the terminal 306 is localized then broadcasts or propagates the file update to the terminal 306.

Figure 5:
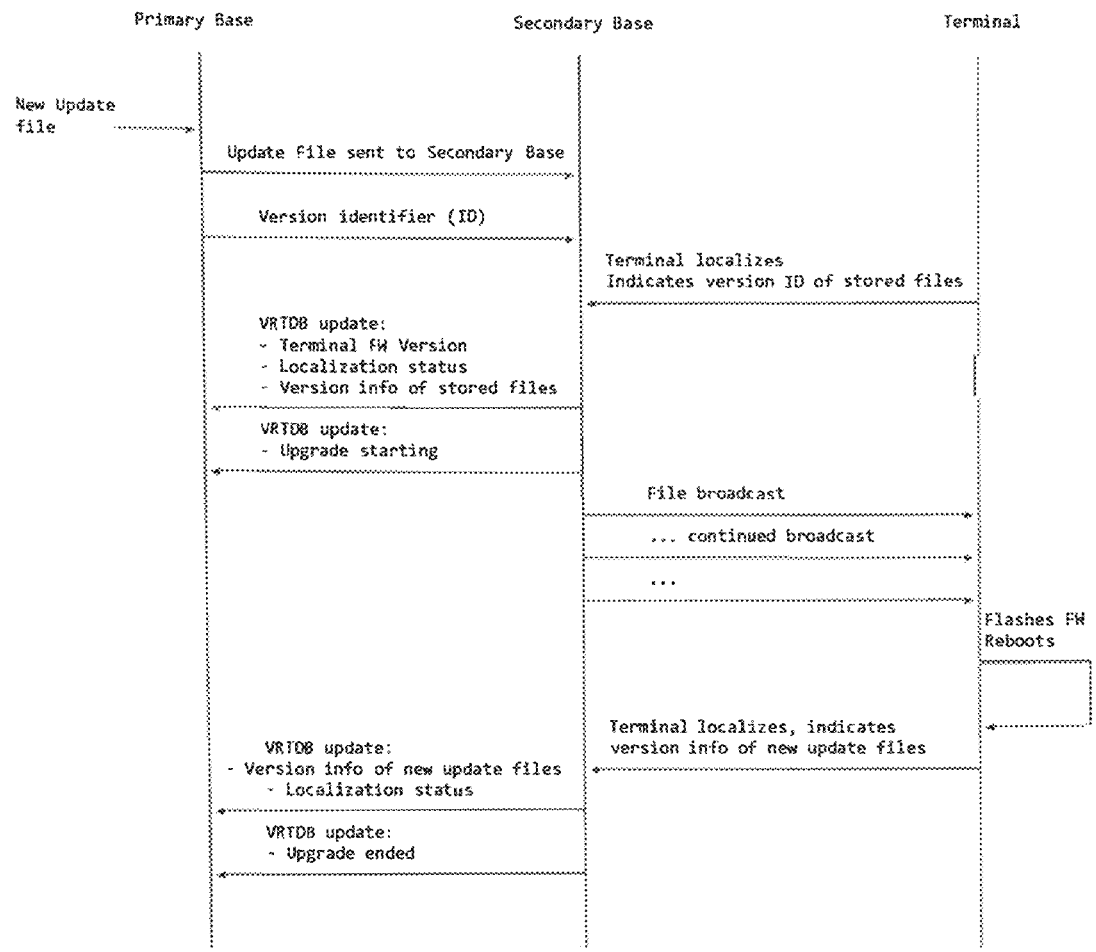
FIG. 5 depicts the signal flow for an example of upgrading a single terminal with a new update file, i.e., propagating an update file to a wireless terminal in a multicell network, according to an example embodiment.

FIG. 5 depicts the signal flow for an example of upgrading a single terminal with a new update file, i.e., propagating an update file to a wireless terminal in a multicell network, according to an example embodiment. As discussed above, the multicell network may include a primary base station 302 in communication with one or more secondary base stations 304 providing communication among a plurality of wireless terminals 306. In embodiments, the network may include only a single base station.

It is noted that the diagram in FIG. 5 shows a simplified view of an example upload/update scenario. In this example there are two bases ("Primary Base" and "Secondary Base") and a single Terminal, which is initially not localized. The details of the update file first being sent to the radio module are omitted from FIG. 5 and presented in FIG. 6.

It is further noted that in this example, a file update occurs which affects a single terminal. In practice, the file update may also affect other terminals 306 in parallel, i.e., a group of terminals 306 may be identified as needing the same file update and therefore the file update may be provided to multiple terminals 306 in parallel. However, for purposes of explanation, updates for other terminals are not included in the discussion of this example.

Beginning at the top of the diagram in FIG. 5 and working downward, a new update file is received by and/or implemented at the Primary Base. The Primary Base obtains the new update file for a Terminal, from which the Primary Base infers the version identifier. The version identifier of the new update file received by the Primary Base could be a version number, variable, or other value as discussed herein. As noted previously the file could be a firmware image file, a configuration file, or directory file, etc.

The Primary Base transmits the update file to the Secondary Base. This can be accomplished for example over the wired LAN via a file service. The Primary Base also transmits the version identifier of the update file to the Secondary Base. The Terminal localizes to the Secondary Base, reporting the version information of its stored files to the Secondary Base. Version information of the files stored on the Terminal could be a version number, variable, or other value.

The Secondary Base updates one or more site-wide VRTDB tables with the version information of the files stored on the Terminal as reported by the Terminal. The version information could be the version of firmware image files, configuration files, or other types of files stored on the Terminal. The information reported to the Secondary Base by the Terminal could include an indication or confirmation that the Terminal is localized to the Secondary Base, i.e., a localization status. When the Secondary Base places the information into the VRTDB the information is propagated to all of the primary and secondary base stations of the site (i.e., system). As a result, every base station in the system has the information.

The file upgrade manager on the Secondary Base monitors the VRTDB and identifies that a Terminal is localized to the Secondary Base that has one or more files that are out of date. Such Terminal can be referred to as a wireless terminal upgrade candidate. The file upgrade manager on the Secondary Base initiates an upgrade phase of the Terminal, indicating its activity change to the VRTDB. This makes the activity visible on the respective user interfaces on the Primary Base and the Secondary Base. The upgrade phase can be scheduled for an operationally convenient time (e.g., a period of low communication traffic).

The broadcast of the update file from the Secondary Base to the Terminal is then initiated. In practice, numerous broadcast packets comprising the update file are sent over the wireless network and are received by the Terminal. The Terminal detects the end of the broadcast (complete file), validates the integrity of the file, and installs the update files on the Terminal, thereby upgrading itself. If for example the update files are firmware files, the Terminal reboots into a new firmware image and localizes to the Secondary Base, indicating its new firmware version or, in any event, the version of the newly installed update files.

The Secondary Base updates the VRTDB tables with the new information, i.e., values/versions of the newly installed update files, and the localization status. The file upgrade manager identifies that the Terminal has newly installed update files, for example a new firmware version that matches the current firmware, or new configuration files, etc. The VRTDB is updated appropriately and the upgrade is ended.

Figure 6:
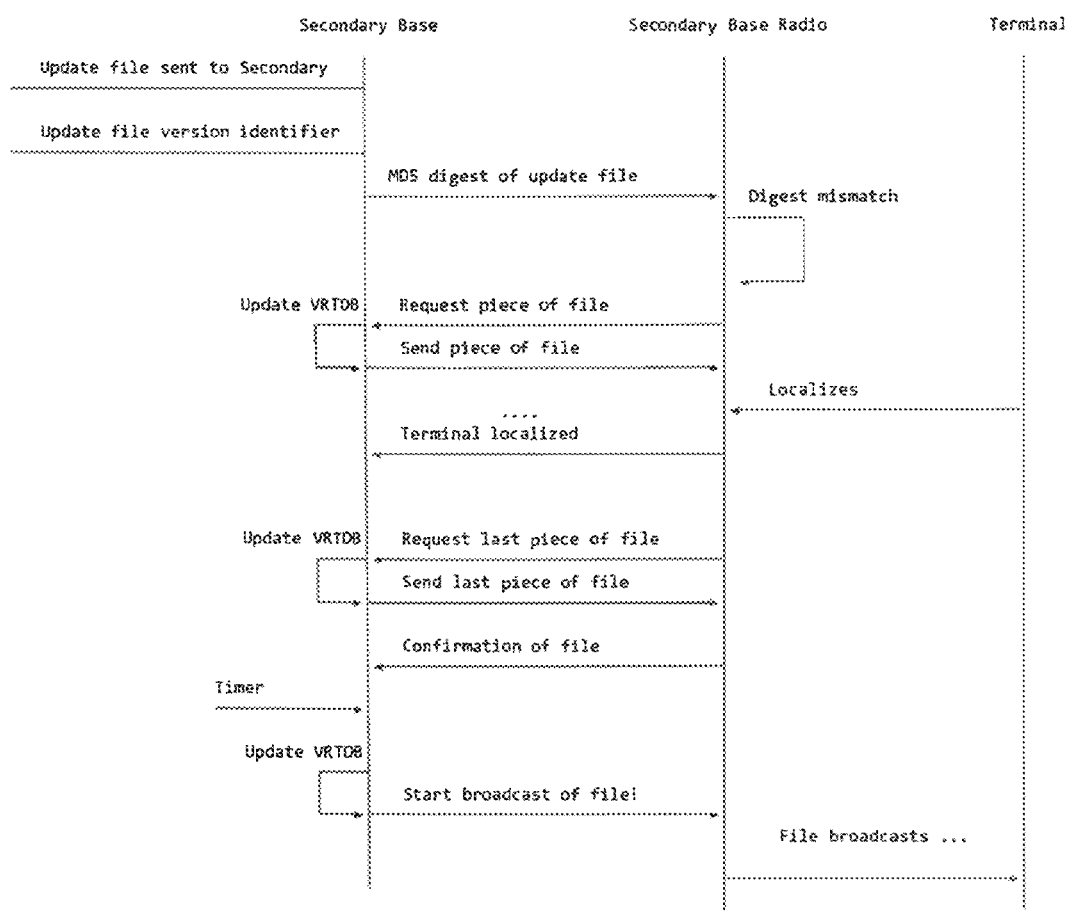
FIG. 6 depicts the signal flow for an example of transferring an update file to a radio of a secondary base station in a multicell network, according to an example embodiment.

FIG. 6 depicts the signal flow for an example of transferring a file, e.g., an update file, to a radio of a secondary base station ("Secondary Base") in a multicell network, according to an example embodiment. As discussed above, the multicell network may include a primary base station 302 in communication with one or more secondary base stations 304 providing communication among a plurality of wireless terminals 306.

The diagram in FIG. 6 shows in more detail the interaction between the host processor of the Secondary Base and its radio before a broadcast upload is initiated. In this example the host processor of the Secondary Base communicates with its radio via a dedicated channel of limited bandwidth. When a new update file becomes available and is sent to the Secondary Base along with the identifier of the update file (e.g., a variable, number, value or the like identifying the version of the update file), the Secondary Base indicates to the radio that a new update file is available by sending the radio a small message digest of the update file. The radio detects a mismatch between the digest and the existing digest of the old version of the file. The radio then initiates a request to the Secondary Base to fetch the file. When everything works smoothly, the file (all pieces from first to last) is correctly received and stored by the radio in its own storage, and the message digest matches. The file upload manager running on the host processor of the Secondary Base receives confirmation that the radio now has the update file.

In the meantime, the Terminal has localized to the Secondary Base. The file upload manager identifies that a Terminal has localized having a file type that is out of date. The file upload manager identifies that the Radio has the new update file, ready for broadcast. Thus, the file upload manager begins the upgrade cycle, and starts the broadcast of the update file. The file upload manager updates the information in the VRTDB in relation to the detailed file transfer progress between the Secondary Base and the radio, which enables the file upload manager of any base in the system to display the transfer progress.

Figure 8:
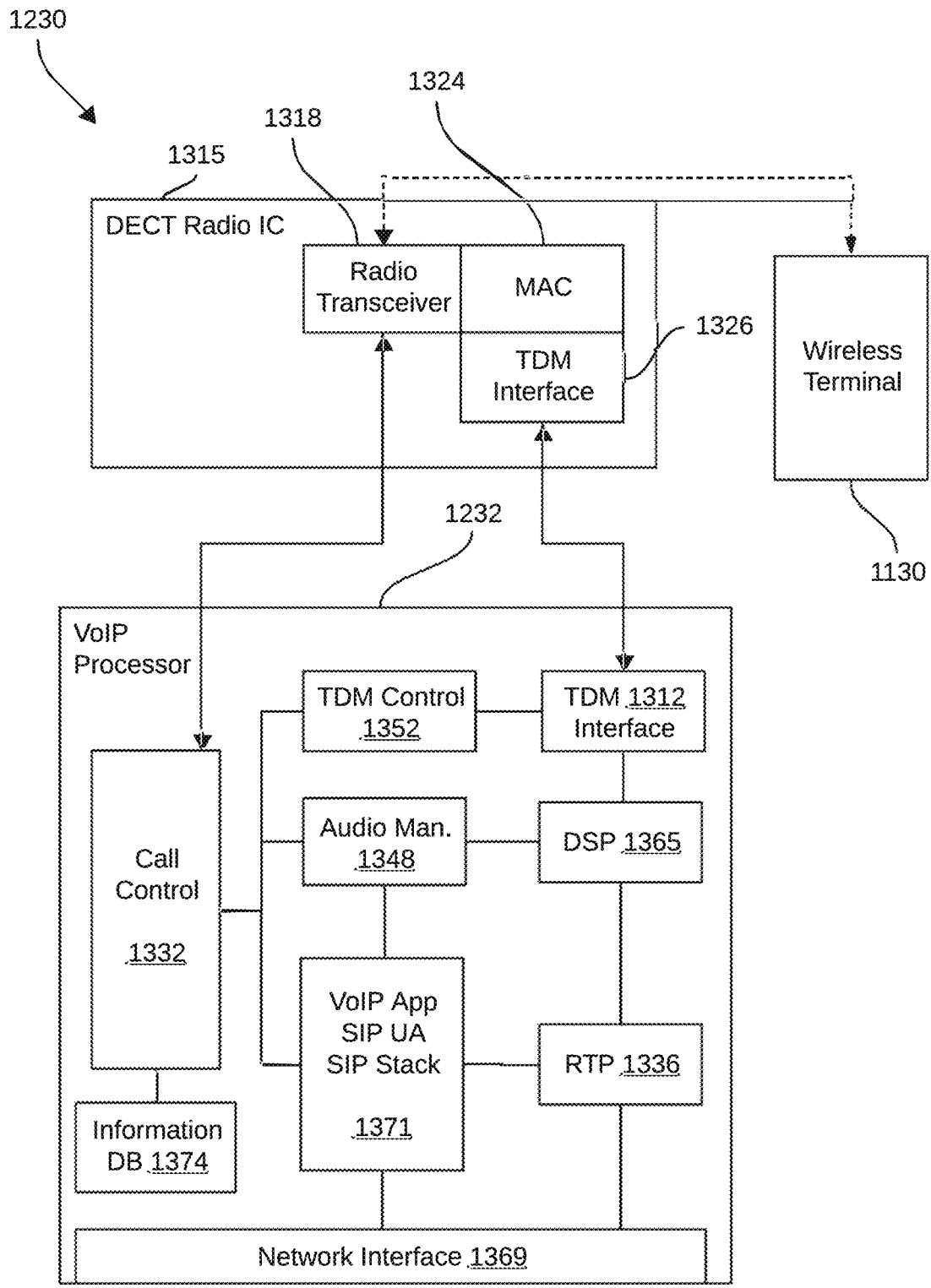
FIG. 8 depicts a base station of a multicell DECT system in which a call is established between a wireless terminal localized to the base station.

FIG. 8 depicts a base station 1230 of a multicell DECT system in which a call is established between a wireless terminal 1130 localized to the base station 1230. The base station 1230 includes a radio integrated circuit (IC) 1315 which handles the wireless radio frequency (RF) communication between the DECT base station and the DECT handsets e.g., wireless terminal 1130. The radio IC 1315 includes a radio transceiver 1318 which handles the physical transmission and reception of RF signals, modulates the digital data to be transmitted wirelessly via RF signals, and demodulates received RF signals to retrieve the received digital data.

The radio IC 1315 includes a medium access control (MAC) module 1324, which is responsible for managing the Time Division Multiple Access (TDMA) time slots and ensuring that each device (e.g., base station or handset) transmits or receives in its allocated time, avoiding collisions. DECT allows for multiple parallel communications, such as voice, data, and control signals, over the same channel. The MAC module 1324 handles the multiplexing of these different types of communication into the TDMA structure.

In the radio IC 1315 the MAC module 1324 is in communication with the radio IC end of a Time Division Multiplexing (TDM) interface 1326 which functionally connects the radio IC to the VoIP processor 1232 of the base station 1230 via the VoIP end of the TDM interface 1312. The data input and output by the VoIP end of the TDM interface 1312 is processed by other components of the VoIP processor 1232, as discussed in further detail below.

The VoIP processor 1232 includes a network interface 1369 for connecting to IP-based networks, e.g., local area networks and the Internet. Additionally, as discussed above, the base station 1230 has a Call Control 1332 for controlling the VoIP processor and other functions of the base station.

The Call Control 1332 interacts with an information database 1374 responsible for storing call-related information, such as SIP data. The information database 1374 may also form part of a shared database within the multicell system. For example, the database 1374 may store and share status information with other databases in other base stations within the multicell system in real-time. The status information may include information such as the base station to which a wireless terminal is currently localized.

The Call Control 1332 interacts with a Voice over Internet Protocol application (VoIP APP) 1371, which handles call setup, management, and termination. Specifically, the VoIP application 1371 handles signaling protocols, such as Session Initiation Protocol (SIP), to establish, manage, and terminate calls over the IP network. For example, the VoIP application sends and receives signaling messages, such as INVITE, ACK, BYE, etc. The VoIP application 1371 is also responsible for the Real-time Transport Protocol (RTP) streams, including packetizing the voice data, handling sequence numbering, timestamping, etc.

The base station 1230 further includes one or more processors, including, for example, the call control 1332 (discussed above), the TDM Control 1352 which interacts within the VoIP end of the TDM Interface 1326 (discussed above) to control time division multiplexing and demultiplexing, and the digital signal processor (DSP) 1365 which handles processing digital signals. These processors may be implemented separately, as depicted in FIG. 8, or may be integrated in various combinations, such as in a single (or a few) processors and/or integrated circuits. One or more of these processors may be used to execute, at least in part, methods disclosed herein.

The base station 1230 may include an RTP module 1336, which is responsible for handling real time protocol (RTP) packets and real time protocol control (RTCP) packets. The base station 1230 may also include an Audio Manager 1348 for handling audio packets extracted from RTP streams.

Example Implementations

As described above, disclosed embodiments are directed to systems and methods for improving the management and control of file transfers to wireless terminals. Such file transfers may include the transfer of update files.

In implementations, the system can handle a one-way broadcast file update on one logical DECT slot/channel at the same time as having a two way slot channel connection for a call setup on a wireless terminal.

Example implementations can also coordinate broadcasts of multiple file types in priority order, so as not to overwhelm the broadcast mechanism. Broadcasts can proceed concurrently with calls. Example implementations can also realize the ability to target specific terminals and terminal groups with specific uploads or updates, in relation to specific versioning mechanisms for determining whether a file on a terminal is up to date.

In implementations, broadcasts of update files can be "rolled out" from the base rather than being sent at the same time. A mechanism or system such as the file manager described herein coordinates roll-out of the broadcasts. The system also monitors roaming in that it can determine which terminals require file updates and which terminals have received them or haven't yet received them. An upload broadcast emanating from a given base can be visible to all terminals in the network. The coordination of file uploads is also sensitive to terminals localizing to a base and roaming away. In embodiments, upload cycles are re-tried. Furthermore, a comprehensive user interface makes the status and progress of uploads plainly visible.

Accordingly, the system can handle roaming and provide administrative visibility to all terminals in the network. By virtue of the functionality discussed above, the system provides administrative visibility into information such as which terminals are localized to which bases, and whether the terminals are up-to-date in their various file types. The system has a comprehensive user interface that enables the status and progress of uploads plainly visible.

In an example implementation the file update manager of a base obtains versions of files stored on terminals along with the type (e.g., handset/deskset) of all terminals localized to the base. The file update manager compares the versions of the stored files to a "target" version (e.g., current or latest version) in a site-wide VRTDB. If any of the stored files are is not up-to-date, the file update manager starts a new terminal file update. The file update manager monitors any changes in the terminals localized to the base (e.g., a terminal roaming to the base, a terminal going out of range, etc.) by monitoring the VRTDB (e.g., a status record such as HandsetStatusDB). In the event of a terminal going out of range while a file update is in progress, the file update manager can send a request to cancel the file update if there are no more terminals of the same type localized to the base. The file update manager can fetch the update status of terminals from the VRTDB. The file update manager can handle a terminal not upgrading by: verifying that the terminal did not go out of range first, and then starting a new file update for that terminal type again.

By virtue of the features of the disclosed embodiments, the system described herein is scalable to handle larger numbers of terminals and more than one terminal type.

The claimed software elements can be realized on a variety of telecommunications systems or subsystems. The following description, in conjunction with the disclosed embodiments described in the foregoing, provides representative, non-limiting examples of potential telecommunications systems or subsystems that could be used to execute the claimed software elements.

At a high level, a telecommunications system or subsystem typically includes, but is not limited to, communication devices, networks, base stations, servers, and a variety of other hardware and software components. Communication devices may include a broad range of devices such as cordless telephones, mobile phones, smartphones, computers, tablets, and other types of devices capable of sending and receiving communication signals. These devices usually include at least one processor, memory, a user interface (such as a display, keyboard, or touch screen), and a network interface for connecting to a network.

The network component of a telecommunications system or subsystem can take various forms, including multicell systems, e.g., Digital Enhanced Cordless Telecommunications (DECT), public switched telephone networks (PSTN), the Internet, mobile networks (e.g., 3G, 4G, 5G), local area networks (LAN), wide area networks (WAN), and others. Base stations and/or servers are also commonly part of telecommunications systems, facilitating the storage, processing, and exchange of data. Like the aforementioned communication devices, these elements generally include a processor and memory for executing software applications, as well as network interfaces for communicating with the network and other devices.

Software elements in the telecommunications system may include operating systems, device drivers, networking software, applications, and other types of software. These software elements can be executed on communication devices, base stations, servers, or other hardware components of the telecommunications systems or subsystems. The claimed software elements may be embodied as computer program code that is executed on one or more of the hardware components of the telecommunications system or subsystem. This code could be stored on a non-transitory computer-readable medium that is part of the communication device, base station, server, or other component, or it could be stored on an external storage device, network storage, or cloud storage.

It should be noted that the described telecommunications systems and subsystems are illustrative and that the claimed software elements can be executed on any suitable telecommunications system or subsystem. The specific configuration of the telecommunications system or subsystem may vary depending on the requirements of the application, performance characteristics of the system, cost considerations, and other factors. The scope of the invention is not limited to the specific telecommunications systems and subsystems described herein but includes any and all systems or subsystems suitable for implementing the present invention.

The foregoing detailed description has presented various implementations of the devices and/or processes through the use of block diagrams, schematics, and illustrative examples. As such block diagrams, schematics, and examples include one or more functions and/or operations, it should be understood by those skilled in the art that each function and/or operation within these block diagrams, flowcharts, or examples can be implemented individually and/or collectively by employing a wide range of hardware, software, firmware, or any combination thereof. It should also be recognized by those skilled in the art that the methods or algorithms described herein may incorporate additional steps, may exclude some steps, and/or may execute steps in an order different from the one specified. The various implementations described above can be combined to create additional implementations.

These modifications and other changes can be made to the implementations in light of the above-detailed description. Generally, the terms used in the following claims should not be construed to limit the claims to the specific implementations disclosed in the specification and the claims. Instead, they should be interpreted to encompass all possible implementations, along with the full scope of equivalents to which such claims are entitled. Consequently, the claims are not limited by the disclosure but are intended to cover all possible implementations within their scope.

What is claimed is:

1. A distributed file management system in a multicell wireless communication network, the network comprising one or more base stations which communicate with wireless terminals, each base station comprising a file manager of the file management system to control file transfers to the wireless terminals, the file manager comprising:
    at least one processor in a base station; and
    memory operatively coupled to said at least one processor, the memory including instructions that, when executed, cause said at least one processor to perform:
        monitoring a shared database to determine, for each wireless terminal of a set of wireless terminals: localization status information, version information of one or more stored files, and terminal type;
        updating the localization status information of the set of wireless terminals when a new wireless terminal localizes to the base station or a wireless terminal in the set of wireless terminals roams away from the base station;
        comparing, for each wireless terminal of the set of wireless terminals, the version information of said one or more stored files and the terminal type to a version identifier and a file type, respectively, of one or more update files received by the base station to define a set of wireless terminal update candidates; and
        broadcasting said one or more update files to corresponding ones of the set of wireless terminal update candidates, based on a respective file type and a respective terminal type, to initiate an upgrade phase of each of the wireless terminal upgrade candidates.

2. The distributed file management system of claim 1, wherein the memory includes instructions that, when executed, further cause said at least one processor to perform:
    stopping the upgrade phase of any wireless terminal update candidate that roams away from the base station, as determined based on the localization status information of the set of wireless terminals.

3. The distributed file management system according to claim 1, wherein the memory includes instructions that, when executed, further cause said at least one processor to perform:
    resuming or restarting the upgrade phase of any wireless terminal update candidate that roamed away from the base station upon localizing again to the base station.

4. The distributed file management system according to claim 1, wherein the memory includes instructions that, when executed, further cause said at least one processor to perform:
    prioritizing said one or more update files according to the respective file type thereof so that higher priority update files are broadcast before lower priority update files.

5. The distributed file management system of claim 4, wherein the memory includes instructions that, when executed, further cause said at least one processor to perform:
    assigning a higher priority to any of said one or more update files that are firmware files relative to any of said one or more update files that are not firmware files.

6. The distributed file management system according to claim 1, wherein the memory includes instructions that, when executed, further cause said at least one processor to perform:
    stopping broadcast of a currently broadcasting update file of said one or more update files if there are no remaining wireless terminal upgrade candidates having a terminal type that corresponds to a file type of the currently broadcasting update file.

7. The distributed file management system according to any claim 1, wherein the memory includes instructions that, when executed, further cause said at least one processor to perform:
    further determining version information of a shared directory of each wireless terminal in the set of wireless terminals.

8. The distributed file management system according to claim 1, wherein said one or more update files comprise one or more of:
    firmware image files, application files, directory files, configuration files, background files, and wallpaper files.

9. The distributed file management system of claim 8, wherein the configuration files are not specific to terminal type.

10. The distributed file management system according to claim 1, wherein the memory includes instructions that, when executed, further cause said at least one processor to perform:
receiving, from a wireless terminal upon localizing to the base station, current firmware version information.

11. The distributed file management system according to claim 1, wherein the memory includes instructions that, when executed, further cause said at least one processor to perform:
receiving, from a wireless terminal upon localizing to the base station, the version information of said one or more stored files.

12. The distributed file management system according to claim 1, wherein, in said comparing of the version information, a wireless terminal is included in the set of wireless terminal update candidates if a file of the one or more update files received by the base station is more current than a corresponding file of said one or more stored files.

13. The distributed file management system according to claim 1, wherein the base station is a secondary base station of the network, and the memory includes instructions that, when executed, further cause said at least one processor to perform receiving said one or more update files from a primary base station of the network.

14. The distributed file management system of claim 13, wherein said one or more update files are received from the primary base station via a local area network.

15. A distributed file management method for a multicell wireless communication network, the network comprising one or more base stations which communicate with wireless terminals, each base station comprising a file manager of the file management system to control file transfers to the wireless terminals, the method comprising:
monitoring a shared database to determine, for each wireless terminal of a set of wireless terminals: localization status information, version information of one or more stored files, and terminal type;
updating the localization status information of the set of wireless terminals when a new wireless terminal localizes to the base station or a wireless terminal in the set of wireless terminals roams away from the base station;
comparing, for each wireless terminal of the set of wireless terminals, the version information of said one or more stored files and the terminal type to a version identifier and a file type, respectively, of one or more update files received by the base station to define a set of wireless terminal update candidates; and
broadcasting said one or more update files to corresponding ones of the set of wireless terminal update candidates, based on a respective file type and a respective terminal type, to initiate an upgrade phase of each of the wireless terminal upgrade candidates.

16. The distributed file management method of claim 15, further comprising:
prioritizing said one or more update files according to the respective file type thereof so that higher priority update files are broadcast before lower priority update file; and
assigning a higher priority to any of said one or more update files that are firmware files relative to any of said one or more update files that are not firmware files.

17. The distributed file management method according to claim 15, wherein said one or more update files comprise one or more of:
firmware image files, application files, directory files, configuration files, background files, and wallpaper files.

18. The distributed file management method according to claim 15, further comprising:
receiving, from a wireless terminal upon localizing to the base station, the version information of said one or more stored files.

19. The distributed file management method according to claim 15, wherein said comparing of the version information further comprises:
including a wireless terminal in the set of wireless terminal update candidates if a file of the one or more update files received by the base station is more current than a corresponding file of said one or more stored files.

20. One or more non-transitory computer-readable storage media comprising instructions which, when executed by at least one processor, cause said at least one processor to carry out a method, as performed in a multicell wireless communication network by one or more base stations which communicate with wireless terminals, the method comprising:
monitoring a shared database to determine, for each wireless terminal of a set of wireless terminals: localization status information, version information of one or more stored files, and terminal type;
updating the localization status information of the set of wireless terminals when a new wireless terminal localizes to the base station or a wireless terminal in the set of wireless terminals roams away from the base station;
comparing, for each wireless terminal of the set of wireless terminals, the version information of said one or more stored files and the terminal type to a version identifier and a file type, respectively, of one or more update files received by the base station to define a set of wireless terminal update candidates; and
broadcasting said one or more update files to corresponding ones of the set of wireless terminal update candidates, based on a respective file type and a respective terminal type, to initiate an upgrade phase of each of the wireless terminal upgrade candidates.

* * * * *